Patented Mar. 23, 1943

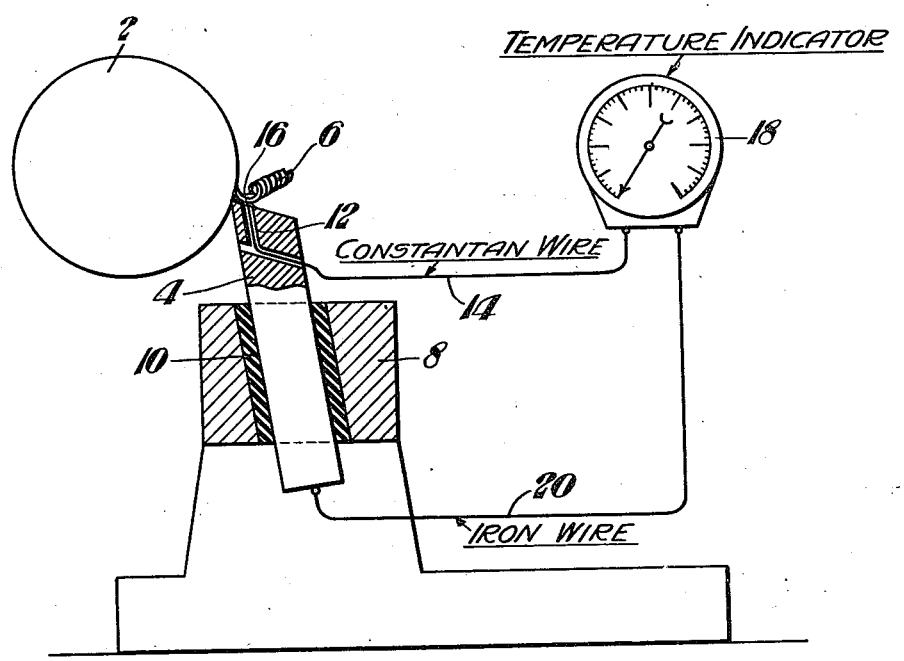

2,314,753

UNITED STATES PATENT OFFICE 2,314,753

APPARATUS FOR INDICATING TEMPERATURE OF CUTTING TOOLS

Morris Asimow, Los Angeles, Calif.

Application October 20, 1941, Serial No. 415,839

4 Claims. (Cl. 73—359)

In the consideration of the properties of metals, the metallographic properties thereof have a determining effect on many of the principal physical properties of the metal. Among the properties of a metal which are affected by the metallographic constitution is the property of machinability, which is tested by the ease with which a given metal may be cut by a cutting tool.

In these days when efforts are being devoted to the high speed production of equipment and materials, fabricators of machined parts face a serious problem and a definite challenge to their ingenuity and resourcefulness. Machine tool builders are making every effort to meet the great demand for new equipment which fabricators demand for the production of strategic equipment. With units of production operating at the limit of capacity, more parts can be machined only as more production units are added to plants, or else steels with superior qualities must be used, so that more parts can be produced per machine hour.

In a general way, machinability refers to the ease with which metals may be cut to produce a satisfactory product. A machinist scrutinizes several phases of the machining operation, an important factor of which lies in the fact that the tools must stand up satisfactorily when the cutting proceeds at a sufficiently rapid rate to insure good economy of production.

A tool must accomplish two things in order to cut successfully. Its shape must be such that its cutting edge, continually impressing itself upon the work material, produces a crack which enables the chip to separate from the parent material. This tool must act further somewhat like an extruding die, in that a chip which is held securely in the shoulder of the cut is pressed against the tool and must change its shape abruptly. High bearing pressures are developed which depend upon the hardness and toughness of the steel. There is an extruding action upon the cutting face of the tool, which is responsible for the greatest share of the power consumed in cutting. Under such severe conditions of bearing pressure, it is clear that the tool will suffer abrasion on the area which is in contact with the chip. To make matters worse, a considerable amount of heat is generated. A large share of this heat results from the severe amount of deformation which is imparted to the chip in its movement over the face of the tool. An important share of the heat also comes from the energy consumed in overcoming sliding friction between the chip and the tool.

It is well known that steels become softer if their temperature is increased. As they become softer, their ability to resist abrasion is materially reduced; and while the so-called high-speed steels preserve their hardness at relatively high temperature, nevertheless, even in the case of high-speed steel, there is a loss in hardness as the temperature is raised. The combined effects of chips sliding under pressure and elevated temperature, especially at the very surface of the tool, are responsible for tool wear. These, aside from the physical properties of the tool itself, are the most important factors which influence tool wear.

The present invention has for its principal object a means of measuring the tool temperature on its cutting edge during actual machining operations, so that a control of the cutting conditions may be effected for obviating excessive wear on the tool through heating of the tool.

Further objects of the invention will become apparent as the description proceeds, and the feature of novelty will be pointed out in particularity in the appended claims.

In general, the temperature of the area of contact between the chip and tool is measured by means of a suitable wire embedded in the tool bit. A wire made from the alloy known as "constantan," which is composed of approximately 60 per cent copper and 40 per cent nickel, and having a melting point of 1280° C., is found to be very suitable for this purpose.

This wire is threaded through a small hole drilled in the tool parallel to its own axis and located very close to the cutting edge. The end of the wire is peened into the hole and the balance of the wire is insulated from the tool. The tool itself is insulated from the tool-holder, and is connected with a suitable conducting wire which conveniently may be iron. The tool and the constantan wire, at their point of connection, form the junction of a tool-constantan thermocouple, which is connected to a suitable temperature measuring instrument which is graduated, preferably, in direct temperature readings, either degrees Fahrenheit or degrees centigrade. In practice, it is found that a temperature measuring instrument sold under the name of "Micromax" is a suitable instrument for this purpose, but it will be understood that any suitably calibrated instrument of suitable sensitivity may be employed.

To calibrate this arrangement, a bar of monel metal is inserted in the lathe and a cut is taken with a standardized speed and size. A thermocouple junction is formed by the monel metal bar and the high-speed steel tool. Simultaneous readings are thus taken from the monel metal bar and steel tool thermocouple, and from the steel tool and constantan thermocouple. The calibration of the monel metal and high-speed steel tool having been determined previously, it remains only to adjust the battery voltage in the temperature measuring meter, to which the steel tool-constantan wire thermocouple is connected, until it indicates the correct temperature.

The invention will be understood more readily by referring to the accompanying drawing, the single figure of which represents diagrammatically one method and apparatus by which the invention may be practiced.

Referring to the drawing, a bar being machined is indicated diagrammatically at 2, this bar being machined by a cutting tool 4 and producing a chip 6. This tool 4 is held in a suitable tool-holder 8, which is provided with an insulating lining 10 which encloses the portion of the tool 4 that is in the holder 8 and insulates the tool from the holder.

At a suitable point adjacent to the cutting edge of the tool, the tool has a hole 12 formed therein, which receives a wire 14 of material dissimilar from the metal of the tool. Such a wire may be a constantan wire and it is peened in the hole to form a thermocouple junction 16 with the metal of the cutting tool. This junction is located immediately adjacent to the cutting edge of the tool, and the wire 14 is connected to a temperature indicating meter 18, which instrument, preferably, is calibrated to read temperatures directly. The tool 4 is connected suitably with the temperature meter 18 by means of a wire 20 of suitable material, such as iron.

It will be seen, therefore, that the degree of heating of the tool during machining of a workpiece is determined by this procedure and apparatus, and temperature is an important factor in determining tool life. Tough or hard steels develop high cutting temperatures, even at low speeds, while, in contrast, chips from machining steels, even at high speeds, are only moderately warm. Thus, temperature, in conjunction with other factors, provides an index of the machinability of the steel.

It will be understood that the temperature-indicating instrument 18 actually is a millivoltmeter or sensitive galvanometer which is operated by the voltage generated by the tool steel-constantan wire thermocouple. However, it is preferred that the instrument read directly in temperatures.

I claim:

1. Apparatus for determining the temperature produced in a cutting tool which is machining a metal work-piece, which comprises a tool for operating on the work-piece, means interiorly of the tool adjacent to the cutting edge of the tool forming a thermoelectric junction with the tool, thereby making the tool an element of a thermocouple, and means for measuring the amount of thermoelectric current produced by the thermocouple.

2. Apparatus for measuring heat generated in a machine tool during machining of a work-piece, which comprises a tool for machining the work-piece, the tool being provided with a bore terminating adjacent to the cutting edge of the tool, an element of dissimilar metal inserted in the bore of the tool adjacent to the cutting edge of the tool and secured to the tool for forming a thermocouple with the tool, and means for measuring the resulting thermoelectric current produced by the thermocouple.

3. Apparatus for measuring heat generated by a machine tool during machining of a work-piece, which comprises a tool for operating on the workpiece, the said tool being provided with a bore terminating adjacent to the cutting edge of the tool having a constantan wire inserted in the bore and secured in the bore and secured to the tool in the bore at a point immediately adjacent to the cutting edge of the tool, thereby forming a thermocouple of which the tool is one element, and means for measuring the amount of thermoelectric current produced by the resulting thermocouple, the said means being calibrated in temperature values.

4. Means for determining temperatures produced in a cutting tool which is machining a workpiece, which comprise, in combination, a cutting tool for machining the workpiece, the tool having a cutting edge and a chip-deflecting surface adjacent to the cutting edge, a bore in the tool terminating at the chip-deflecting surface of the tool immediately adjacent to the cutting edge of the tool, means in the said bore forming a thermoelectric junction with the tool at the cutting edge, thereby making the tool an element of a thermocouple operable responsively to frictional heat generated in the tool as the tool machines the workpiece, and means for measuring the amount of thermoelectric current produced by the thermocouple, the thermoelectric current and the heat in the tool which produce the said current being an index of machining properties of the workpiece under given conditions of machining.

MORRIS ASIMOW.